UNITED STATES PATENT OFFICE.

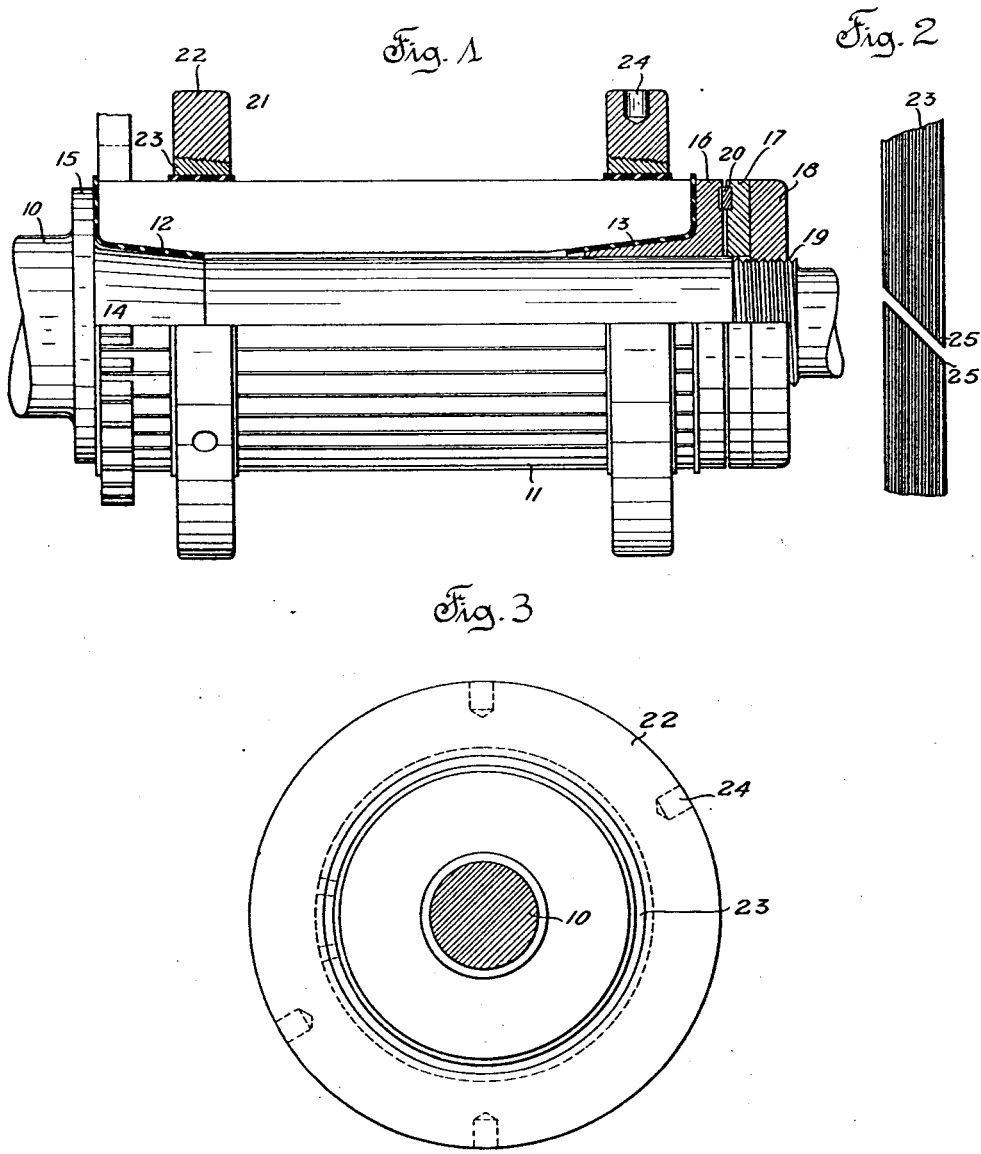

HARRY B. WEIR, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,117,731.          Specification of Letters Patent.      Patented Nov. 17, 1914.

Application filed February 14, 1910. Serial No. 543,879.

*To all whom it may concern:*

Be it known that I, HARRY B. WEIR, a citizen of the United States, residing at Milwaukee, in the county of Milwaukee and State of Wisconsin, have invented certain new and useful Improvements in Dynamo-Electric Machines, of which the following is a full, clear, and exact specification.

My invention relates to commutators, and particularly to means for reinforcing them.

In high speed dynamo-electric machines the centrifugal forces developed are very large, and means for reinforcing the various rotating parts must generally be used. Thus it has been proposed to hold high speed commutators together by means of split retaining rings.

The main object of the invention is to provide means for retaining the commutators of dynamo-electric machines.

A further object is to provide retaining and clamping rings adapted to engage and retain the segments of the commutator between their ends and to provide means whereby the rings can be effectively and easily tightened and securely held in position, the rings being so arranged that they can be quickly mounted on and removed from the commutator.

In carrying out my invention I provide split retaining rings properly supported for engaging segments of the commutator.

In the accompanying sheet of drawings Figure 1 is a partial longitudinal sectional view of a commutator embodying my invention; Fig. 2 is an enlarged fragmentary view of a portion of my split retaining ring; and, Fig. 3 is an end view of a commutator equipped with my invention.

A shaft 10 carries a commutator 11. The bars of the commutator 11 rest at one end on insulation 12 mounted on an inclined portion 14 of the shaft and against a flange 15. The other ends of the bars rest on insulation 13 mounted on an inclined or cone-shaped seat 16 which is free to move within small limits, longitudinally of the shaft. This seat, which supports one end of the commutator and centers the latter relatively to the shaft is held in place by a collar 17 and nut 18, the latter of which engages a threaded portion 19 of the shaft. Interposed between the seat 16 and collar 17 and seated in grooves therein is a yielding ring 20 which provides for the longitudinal expansion of segments when they become heated. The bars or segments are surrounded by supporting members 21, preferably of some strong durable material, such as nickel steel. Two retaining members which are well insulated from the bars are employed in this particular case, although a greater or less number may be used.

The retaining members 21 comprise two rings which are relatively concentrically arranged, the outer ring 22 being internally threaded and the inner ring 23 being externally threaded. The inner ring is split, as shown in Fig. 2 of the drawings, and is mounted upon the commutator and insulated therefrom. The thread of the outer ring is made to engage the thread of the inner ring and is screwed thereon by means of wrenches, keys, or other means which engage slotted portions 24 in the outer ring. The coöperating or threaded engaging portions of the inner and outer rings are inclined so that when the solid outer ring is screwed onto the inner split ring, the latter is drawn together, diminishing the size of the gap between the end portions 25 of the inner ring, as shown in Fig. 2, and materially decreasing the diameter thereof. It is, therefore, seen that by means of these rings the segments of the commutator can be reinforced and clamped to any degree of tightness and rigidity. It is also apparent that there is a wedge action between the inner and outer rings and that there is a mutual clamping action between the solid outer ring and the commutator segments by means of the intermediate split ring.

The means which I have disclosed for retaining the segments is very effective and reliable for holding the segments at all times in their proper positions and provides means which can be readily mounted on and removed from the commutator without the expenditure of much time or labor. It will be seen that the construction which I have provided can be applied to commutators of any size and is a unique means for reinforcing commutators and provides for its own adjusting and tightening.

Many modifications may be made in the arrangement specifically shown and described, and I aim in my claims to cover all modifications of this invention which do not depart from the spirit and scope of the same.

What I claim as new is:

1. In the rotary member of a dynamo-electric machine, the combination of a commutator, a split ring mounted thereon, the outer surface of said ring being beveled and provided with a thread, and a solid ring having its inner surface circumferentially threaded and engaging the threaded portion of said split ring to clamp the bars of said commutator in a fixed position.

2. In a dynamo-electric machine, a commutator, and means for holding the segments thereof together and in place, comprising a two-part securing ring, the inner part being externally beveled and threaded and split in a plane at an angle to the axis of the ring, and the outer part being internally beveled and threaded and adapted to contract the inner part on the commutator by rotation of said outer part on said inner part when in threaded engagement therewith.

Milwaukee, Wis., Feb. 2, 1910.

In testimony whereof I affix my signature, in the presence of two witnesses.

HARRY B. WEIR.

Witnesses:
CHAS. L. BYRON,
ROB. E. STALL.